United States Patent [19]

Yamamoto et al.

[11] Patent Number: 4,596,837
[45] Date of Patent: Jun. 24, 1986

[54] SEMISINTERED POLYTETRAFLUOROETHYLENE ARTICLE AND PRODUCTION THEREOF

[75] Inventors: Katsutoshi Yamamoto, Osaka; Shoji Kawachi, Hyogo, both of Japan

[73] Assignee: Daikin Industries Ltd., Osaka, Japan

[21] Appl. No.: 642,770

[22] Filed: Aug. 21, 1984

Related U.S. Application Data

[63] Continuation-in-part of Ser. No. 468,295, Feb. 22, 1983, abandoned.

[30] Foreign Application Priority Data

Feb. 22, 1982 [JP] Japan .................................. 57-27578
Aug. 25, 1983 [JP] Japan ................................ 58-155649

[51] Int. Cl.$^4$ .............................................. C08J 9/24
[52] U.S. Cl. ..................................... 521/145; 521/919; 528/481; 264/127
[58] Field of Search ................. 528/481; 521/145, 919; 526/255

[56] References Cited

U.S. PATENT DOCUMENTS

| | | | |
|---|---|---|---|
| 3,245,972 | 4/1966 | Anderson et al. | 260/92.1 |
| 3,558,583 | 1/1971 | Alsup et al. | 526/255 |
| 3,629,219 | 12/1971 | Esker | 260/92.1 |

FOREIGN PATENT DOCUMENTS 53-055378  5/1978  Japan .
1355373  6/1974  United Kingdom .

*Primary Examiner*—Paul R. Michl
*Attorney, Agent, or Firm*—Birch, Stewart, Kolasch & Birch

[57] ABSTRACT

A semisintered polytetrafluoroethylene article which is prepared by heating an unsintered polytetrafluoroethylene article at a temperature of at least the melting point of a sintered polymer, the article having an endothermic curve at a temperature of 345±5° C. on a crystalline melting chart measured with a differential scanning carolimeter and a crystalline conversion of from 0.10 to 0.85 defined by heat of fusion of the unsintered, semisintered and sintered polymer, and the crystallinity of the semisintered article measured by X-ray diffraction being from 80 to 93%. The article is expandable biaxially to afford a porous polytetrafluoroethylene material having an almost unporous surface.

13 Claims, 9 Drawing Figures

SEMISINTERED POLYTETRAFLUOROETHYLENE ARTICLE AND PRODUCTION THEREOF

The present application is a continuation-in-part of application Ser. No. 468,295, filed Feb. 22, 1983, abandoned.

FIELD OF THE INVENTION

The present invention relates to a semisintered polytetrafluoroethylene (hereinafter referred to as "PTFE") article and a process for producing the same. More particularly, it relates to a semisintered PTFE article which is expandable biaxially and a process for producing the article, and further to a porous PTFE material produced by expanding the semisintered PTFE article.

BACKGROUND OF THE INVENTION

There are several known processes for producing a porous PTFE material by expanding a paste extruded unsintered PTFE article including (1) a process comprising paste extruding PTFE fine powder having a crystallinity of at least 95% at a temperature lower than the melting point of the powder, extracting an extrusion lubricant, drying the article and expanding the article at a temperature lower than the crystalline melting point of PTFE (cf. Japanese Patent Publication Nos. 44664/1973 and 18991/1976), (2) a process comprising heating a sintered PTFE at a temperature of more than 327° C. and then cooling it very slowly to improve the crystallinity of PTFE, and expanding the PTFE article (Japanese Patent Publication No. 42794/1978) and (3) a process comprising sintering a PTFE film at a temperature not lower than 327° C. and expanding the sintered sheet across the calendering direction (Japanese Patent Publication (unexamined) No. 55378/1978).

According to the process (1), the resultant PTFE material may be biaxially stretchable and has a large tensile strength and a very low apparent specific gravity. However, in this process, the PTFE fine powder used should have a crystallinity of at least 95%. The expanded porous PTFE material should be heat set at a temperature higher than the melting point of PTFE and the surface of the unsintered porous PTFE material is tacky and easily contaminated.

In the process (2), the heat set step is not necessary and the produced porous PTFE material has superior gas permeability to an unstretched material. However, the sintered PTFE material can be stretched only monoaxially and the draw ratio is as low as about four. The process comprises many steps including at least two heating steps so that it requires a large amount of heat energy and a long time. The produced porous PTFE material has a comparatively high apparent density.

In the process (3), the sintered PTFE sheet is stretchable only in a direction across the calendering direction at a temperature lower than 250° C. at a draw ratio smaller than 4.2. The produced porous PTFE material has a comparatively high apparent density.

SUMMARY OF THE INVENTION

As a result of an extensive study, it has now been found that a semisintered PTFE article is stretchable biaxially and affords a porous PTFE material having good tensile strength and a smooth surface, the density or apparent specific gravity of which may be adjustable with the final use.

According to the present invention, there is provided a biaxially stretchable semisintered polytetrafluoroethylene article having good tensile strength and smooth surface properties which is produced by heating an unsintered polytetrafluoroethylene article which has been obtained by paste-extrusion of polytetrafluoroethylene fine powder at a temperature of at least the melting point of a sintered polymer, the article having an endothermic curve at a temperature of 345°±5° C. on a crystalline melting chart measured with a differential scanning carolimeter and a crystalline conversion of from 0.10 to 0.85 defined by heat of fusion of the unsintered, semisintered and sintered polymers, and the crystallinity of the semisintered article measured by X-ray diffraction being from 80 to 93%.

DETAILED DESCRIPTION OF THE INVENTION

Figure 1:
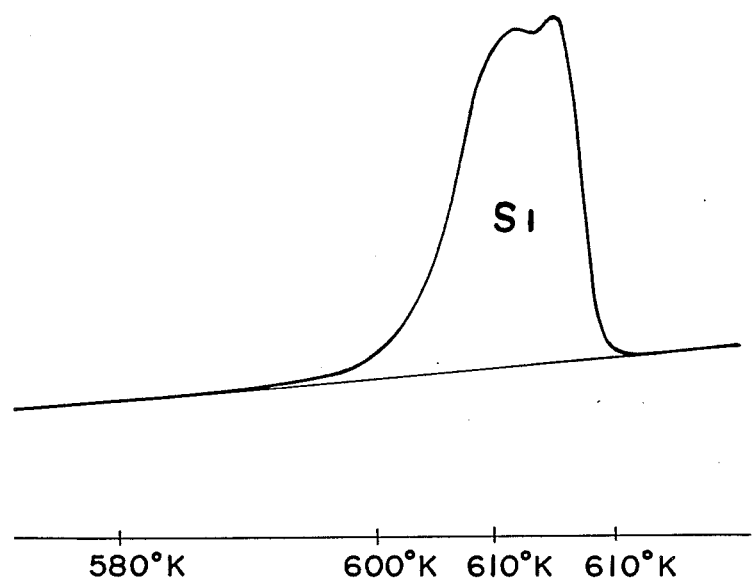
FIG. 1 shows an example of the endothermic curve of the unsintered PTFE.

"PTFE" used herein includes a homopolymer of tetrafluoroethylene and copolymers of tetrafluoroethylene modified with not more than 2% by weight of other monomer(s) copolymerizable with tetrafluoroethylene.

The semisintered PTFE article of the present invention may be produced by heating a paste extruded or compression molded unsintered PTFE article at a temperature of at least the melting point of the sintered PTFE, preferably of from the melting point of the sintered PTFE to the melting point of the unsintered PTFE. Alternatively, the semisintered article of the present invention may be produced by heating the unsintered PTFE article at a temperature higher than the melting point of the unsintered PTFE for a very short period of time, for example, at 360° C. for less than 20 seconds. However, if the unsintered PTFE article is heated at a temperature lower than the melting point of the sintered PTFE, longer heating of the unsintered PTFE article cannot produce a semisintered PTFE article.

The heating time period required in the present process may be determined by measurement of the apparent specific gravity of the heated article. The unsintered PTFE article is porous and its apparent specific gravity is usually from 1.2 to 1.7, preferably from 1.4 to 1.7, which is lower than that of PTFE itself (generally about 2.2). When the porous unsintered PTFE article is heated at a temperature of from 350° to 400° C., which is a usual sintering temperature for PTFE, pores in the article are diminished and the article shrinks with its apparent specific gravity approaching the true specific gravity of PTFE. The same results are achieved by the heating step of the present invention. Generally, the apparent specific gravity of the heated PTFE article is at least 1.8. Even a semisintered PTFE article of the present invention having a specific gravity of from 2.20 to 2.25 can be expanded to obtain a porous PTFE material. When the thickness of the film or sheet, the wall thickness of the tube or the diameter of the rod is less than 0.2 mm, most of the article can be sintered in a comparatively short heating period. However, when they are from about 0.2 to about 2 mm, a longer heating period is required than when they are less than 0.2 mm. In any case, the sintering proceeds from the surface toward the inner portion of the article.

Another characteristic feature of the semisintered PTFE article of the present invention is that its surface is nearly nonporous. Thereafter, the heating period may be determined by observing the porosity of the surface of the heated article. One method for observing the porosity of the surface comprises applying a solvent on the surface. For example, a marker ink is applied on the surface and wiped with a cloth impregnated with a solvent such as toluene. If the ink is removed, the surface is nonporous.

In addition to the above described changes observed in the semisintered PTFE article, transparency of the PTFE article also changes. When the heating temperature is lower than the melting point of the sintered PTFE, the article remains opaque. The thin or small semisintered PTFE article of the present invention is generally transparent.

Further, the amorphous index of the semisintered PTFE article of the present invention is larger than that of the unsintered PTFE, and smaller than that of the sintered one.

After heating the unsintered PTFE article for a sufficient period of time to obtain the semisintered PTFE article in a furnace or a salt bath kept at an adequate temperature, the semisintered PTFE article is removed from the furnace or the salt bath and cooled and expanded in a separate stage. In the process of the present invention, it is not necessary to cool the article slowly. Alternatively, the heated article may be expansed successively while hot.

The crystalline conversion of the semisintered PTFE article of the present invention is determined as follows:

10.0±0.1 mg of a sample of the unsintered PTFE is prepared. Since the sintering proceeds from the surface toward the inner portion as explained above, the degree of the semisintering of the article is not necessarily homogeneous throughout the article, and the semisintering is less homogeneous in a thicker article than in a thinner one. In the preparation of the sample, it is, therefore, to be noted that various portions having various degrees of semisintering must be sampled uniformly.

The crystalline melting chart is recorded by means of a differential scanning carolimeter (hereinafter referred to as "DSC", for example DSC-2 of Perkin-Elmer). First the sample of the unsintered PTFE is charged in an aluminum-made pan of the DSC, and the heat of fusion of the unsintered PTFE and that of the sintered PTFE are measured as follows:

(1) The sample is heated at a heating rate of 160° C./min. to 277° C. and then at a heating rate of 10° C./min. from 277° C. to 360° C.

An example of a crystalline melting chart recorded during this heating step is shown in FIG. 1. A position where an endothermic curve appears in this step is defined as "a melting point of the unsintered PTFE" or PTFE fine powder.

(2) Immediately after heating to 360° C., the sample is cooled at a cooling rate of 80° C./min. to 277° C., and (3) again the sample is heated at a heating rate of 10° C./min. to 360° C.

Figure 2:
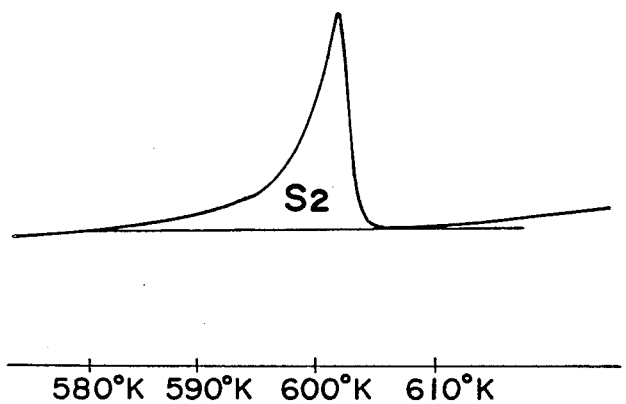
FIG. 2 shows an example of the endothermic curve of sintered PTFE.

An example of a crystalline melting chart recorded during the heating step (3) is shown in FIG. 2. A position where an endothermic curve appears in the heating step (3) is defined as "a melting point of the sintered PTFE".

The heat of fusion of the unsintered or sintered PTFE is proportional to the area between the endothermic curve and a base line which is drawn from a point on the DSC chart at 307° C. (580° K) and tangential with the curve at the right-hand foot of the endothermic curve.

Figure 3:
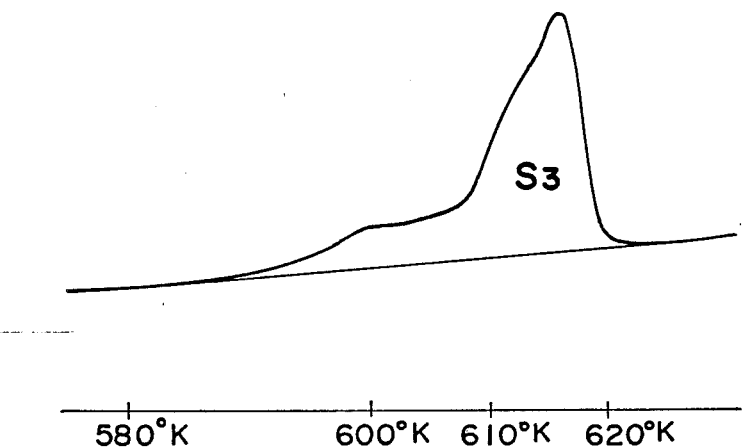
FIG. 3 shows an example of the endothermic curve of semisintered PTFE.

Secondly, a crystalline melting chart for the semisintered PTFE is recorded following the step (1), an example of which charge is shown in FIG. 3.

Then, the crystalline conversion is defined by the following equation:

$$\text{Crystalline conversion} = (S - S_3)/(S_1 - S_2)$$

wherein $S_1$ is the area of the endothermic curve of the unsintered PTFE (cf. FIG. 1), $S_2$ is the area of the endothermic curve of the sintered PTFE (cf. FIG. 2) and $S_3$ is the area of the endothermic curve of the semisintered PTFE (cf. FIG. 3).

Generally, the crystalline conversion of the semisintered PTFE article of the invention is from 0.10 to 0.85, preferably from 0.15 to 0.70.

The crystallinity is defined by X-ray diffraction as follows:

The X-ray diffractometer used is Geiger Flex Rad-II (Riken Electric Company). The source of the X-ray is Cu-K$_\alpha$ and X-ray are monochromatized by means of a monochrometer.

A sample of the semisintered PTFE is charged in an aluminum-made holder and X-ray diffraction pattern at $2\theta$ ranging from 10° to 25° is measured. A typical X-ray diffraction pattern is shown in FIG. 4.

Figure 4:
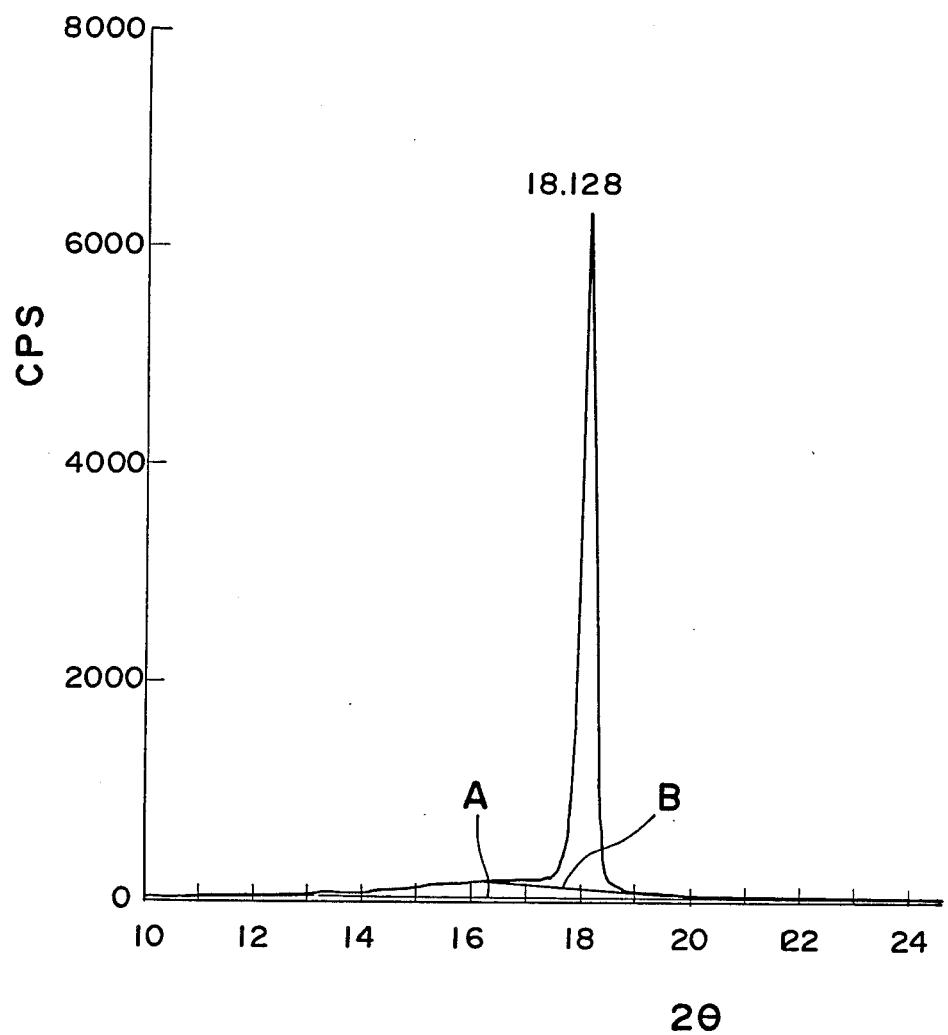
FIG. 4 shows a typical X-ray diffraction pattern of the semisintered PTFE.

The crystallinity is determied from the peak at $2\theta = 18°$ corresponding to the amorphous portion as follows:

In order to separate an area for the crystalline portion and that for the amorphous portion in the X-ray diffraction peak, a line is drawn from a point on the curve at $2\theta = 16°$ to the right-hand foot of the peak as shown in FIG. 4.

The crystallinity is calculated by the following equation:

$$\text{Crystallinity (\%)} = \frac{100 \, Ic}{Ic + 0.66 \, Ia}$$

wherein Ic is the area for the crystalline portion and Ia is the area for the amorphous portion.

Generally, the crystallinity of the semisintered PTFE article of the present invention is from 80 to 95%, preferably from 85 to 92%.

It is found that the semisintered PTFE article of the present invention has a characteristic surface condition in comparison with the unsintered and sintered PTFE articles. This is demonstrated in FIGS. 5 to 7, which are scanning electron microscopic photographs of the replicas of the surfaces of the unsintered PTFE article (film No. (19) in Example 3, Table 8), of the semisintered PTFE article (film No. (12) in Example 3, Table 8), and of the sintered PTFE article (film No. (18) in Example 3, Table 8) (each ×16,000).

Figure 5:
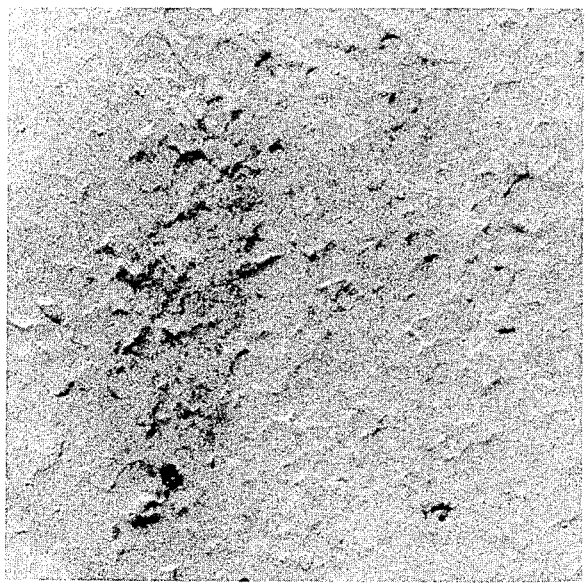
FIGS. 5 to 7 are electron microscopic photographs of the replicas of the surfaces of the unsintered PTFE article, the semisintered PTFE article and the sintered PTFE article respectively.
Figure 6:
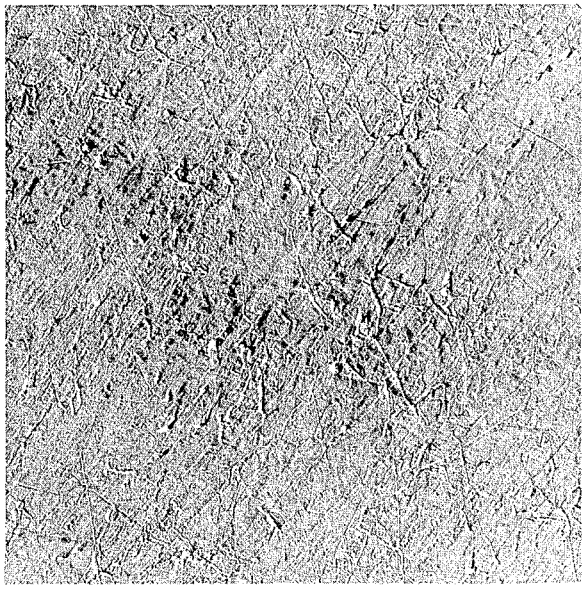

In the surface of the unsintered PTFE article shown in FIG. 5, a number of primary particles are observed. On the surface of the sintered PTFE article shown in FIG. 7, the well developed band structure which is characteristic of the PTFE article is observed. On the contrary, on the surface of the semisintered PTFE article of the present invention, particles or band structure are not or hardly observed. In FIG. 6, no particle or band structure is observed.

The semisintered PTFE article of the present invention may be any conventional shape such as film, sheet, tube, rod, etc.

In the semisintered PTFE article of the present invention, organic or inorganic fillers may be incorporated in order to improve the mechanical, physical and chemical properties and to endow various functions to the semisintered PTFE article. Specific examples of the fillers are glass, carbon, graphite, silica, titanium oxide, zinc oxide, potassium titanate, talc, polymers (e.g. tetrafluoroethylene polymers, polyamides, polyamideimide, etc.).

In order to improve the adhesion property of the surface of the semisintered PTFE article of the present invention, it may be etched by a per se conventional technique, for example, by surface treatment with a sodium solution is a liquid ammonium or a sodium naphthalene complex in a cyclic ether, or by sputter-etching.

The semisintered PTFE article of the present invention is per se useful. For example, a semisintered PTFE film may be used as a cap of a container for a solvent. Since its surface before expansion is nonporous, it effectively seals the solvent. Once it is expanded by application of pressure, for example, with a finger, it becomes porous and the solvent permeates the porous article.

The semisintered PTFE article of the present invention is fusion bondable to another semisintered PTFE article or to other substrates. It may be laminated or formed in a gasket.

Further, the semisintered PTFE article is expandable or stretchable, and forms a porous PTFE material, which is also within the scope of the present invention.

Expansion or stretching of the semisintered PTFE article is carried out by a per se conventional method at a temperature of from a room temperature to the melting point of the unsintered PTFE.

The draw ratio may vary with the final use and is usually up to about 10.

The semisintered PTFE article of the present invention can be expanded at an expansion rate as low as 0.5%/sec., and may be expanded even with a finger.

In the expansion of the semisintered PTFE article, dimensional change is larger than that of the conventional PTFE article. For example, in the case of the preparation of a film thinner than 25$\mu$, since large dimensional change does not occur in expanding an unsintered film, a very thin unsintered film must be expanded. However, a calendered unsintered film is frilled, and particle orientation is not homogeneous so that the strength of the film is uneven. Therefore, it is very difficult to produce a thin PTFE porous film commercially by conventional methods, and a commercially available PTFE porous film has a thickness larger than 50$\mu$. On the contrary, according to the present invention, a thin PTFE porous film as well as a thick PTFE porous film is easily prepared.

The porous PTFE material prepared by expanding the semisintered PTFE article of the present invention has an endothermic curve at 345°±5° C. on a crystalline melting chart. The area of the endothermic curve of the porous PTFE material is smaller than that of the semisintered PTFE article.

Figure 8:
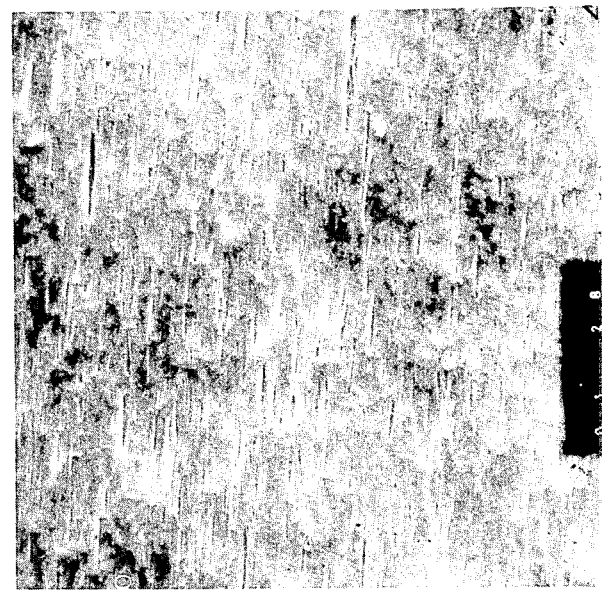
FIG. 8 is an electron microscopic photograph of the surface of the film No. 4 (not heat set)
Figure 9:
FIG. 9 is an electron microscope photograph of the cross section of the film No. 2 (heat set).

When the porous PTFE material is to be used as a filter, it is desirable for the material to be clogged as little as possible and to have a high filtrate transmission rate, and also to have excellent mechanical properties. The porous PTFE material of the present invention has a peculiar structure such that porosity of the surface is smaller than that of the inner region. These structural characteristics are shown in FIGS. 8 and 9, which are scanning electron microscopic photographs of the surface of the porous PTFE material (×3000) of film No. 5 (not heat set) in Table 4 of Example 1 and of the cross section (×3000) of film No. 2 (heat set) in Table 4 of Example 1, respectively. Thus, the porous PTFE material of the present invention is hardly clogged and has a relatively high transmission rate even when it is thick.

When the conventional calendered PTFE film is expanded in a direction across the calendering direction, its mechanical strength deteriorates and should be laminated to obtain a film having equal strength in any direction. However, the porous PTFE film of the present invention has excellent strength in directions across and along the calendering direction and can be used as a monolayer film.

The present invention will be hereinafter explained further in detail by the following Examples wherein parts are by weight.

EXAMPLE 1

(1) Prepration of unsintered PTFE article

A cylindrical rod was made by extruding a mixture of PTFE fine powder ("Polyflon fine powder F-104" manufactured by Daikin Kogyo Co., Ltd.) (100 parts) and an extrusion assistant, a hydrocarbon oil ("Isopar M" manufactured by Esso Oil Co., Ltd.) (24 parts) with an extruder having a cylinder inner diameter of 130 mm and an extruding mold die inner diameter of 12 mm. The extruded rod was calendered with rolls heated at 70° C. at a rate of 28 m/min. to obtain a film. The film was immersed in trichloroethylene kept at 50° C. to extract the extrusion assistant and air dried. The formed unsintered PTFE film had an average thickness of 100 $\mu$m, an average width of 200 mm and an apparent density of 1.5 g/cm$^3$.

The mechanical strength of the unsintered film of 10 mm wide was measured at a pulling rate of 200 mm/min. in a direction across or along the calendering direction. The results are shown in Table 1.

TABLE 1

| Pulling direction | Tensile strength (MPa) | Elongation (%) |
|---|---|---|
| Across calendering direction | 14.7 | 200 |
| Along calendering direction | 1.5 | 1500 |

(2) Heating of unsintered film

The thus obtained unsintered PTFE film was heated in an onven kept at 200° C., 300° C., 320° C., 330° C. or 360° C. for a predetermined period of time and cooled to a room temperature. The properties of the heated films were measured as follows:

Density

Measured according to JIS (Japanese Industrial Standard) 6892-1976.

Transparency

Determined by viewing.

Endothermic curve in DSC chart

Measured as described above.

Amorphous index

Determined as a ratio of absorption at 778 cm$^{-1}$ to that at 2367 cm$^{-1}$ of infrared absorption spectrum.

Tensile strength and elongation

In the cases of film Nos. (1), (2) and (3), the film was cut in a direction along the calendering direction into a strip of 10 mm wide, and in the cases of the film Nos. (4) to (8), the film was cut into JIS No. 3 dumbbell. The tensile strength and elongation were measured at room temperature at a pulling rate of 200 mm/min.

Permeability of marker ink

One volume of commercially available marker ink (trade name "Magic ink") was diluted with two volumes of toluene and applied on the film with a brush. After it had dried, the inked surface was wiped with a cloth impregnated with a toluene.

The results are shown in Tables 2(1) and 2(2).

In this Example, the films (4) and (6) are within the scope of the invention, and others are comparative.

(3) Expansion of heated film

I. Expansion of cut film

Each heated film was cut into a strip 20 mm wide and 50 mm long. The strip was stretched at a temperature of 300° C. in a direction along or across the calendering direction with the side ends free at a pulling rate of 100 to 700%/sec.

Stretchability of the strip and reduction rates of thickness and width, density and tensile strength of the thus formed porous PTFE film are shown in Table 3.

The tensile strength was measured with a strip 10 mm wide when the width was not less than 10 mm or with the film as such when the width was less than 10 mm at a pulling rate of 200 mm/min.

TABLE 3

| Film No. | Stretching direction | Stretchability | Reduction rate (%) Thickness | Reduction rate (%) Width | Density (g/cm³) | Tensile strength (MPa) |
|---|---|---|---|---|---|---|
| (1) | Along | Yes | 6 | 3 | 0.4 | 34.3 |
|  | Across | (Uneven) | — | — | — | — |
| (2) | Along | Yes | 5 | 9 | 0.4 | 34.3 |
|  | Across | (Uneven) | — | — | — | — |
| (3) | Along | Yes | 6 | 9 | 0.4 | 39.2 |
|  | Across | (Uneven) | — | — | — | — |
| (4) | Along | Yes | 32 | 35 | 0.7 | 53.9 |
|  | Across | Yes | 32 | 55 | 1.4 | 201 |
| (5) | Along | (Broken) | — | — | — | — |
|  | Across | (Broken) | — | — | — | — |
| (6) | Along | Yes | 34 | 36 | 0.8 | 59.8 |
|  | Across | Yes | 34 | 55 | 1.5 | 206 |
| (7) | Along | (Broken) | — | — | — | — |
|  | Across | (Broken) | — | — | — | — |
| (8) | Along | (Broken) | — | — | — | — |
|  | Across | (Broken) | — | — | — | — |

TABLE 2(1)

| Film No. | Heating Temp. (°C.) | Heating Time | Density (g/cm³) | Degree of shrinkage (%) Along*¹ | Degree of shrinkage (%) Across*² | Transparency | Endothermic peak in DSC (°C.) | Amorphous index |
|---|---|---|---|---|---|---|---|---|
| (1) | 200 | 30 min. | 1.55 | 5 | 0.5 | Opaque | 346.5 | 0.12 |
| (2) | 300 | 30 min. | 1.65 | 7.5 | 1 | Opaque | 346 | 0.12 |
| (3) | 320 | 30 min. | 1.75 | 9 | 1 | Opaque | 347 | 0.13 |
| (4) | 330 | 30 min. | 2.05 | 21 | 6 | Substantially transparent | 346 | 0.35 |
| (5) | 360 | 30 sec. | 2.15 | 26 | 8 | Transparent | 327 | 1.63 |
| (6) | 360 | 5 sec. | 2.21 | 24 | 6 | Transparent | 346 | 0.42 |
| (7) | 360 | 30 min. | 2.16 | 26 | 7 | Transparent | 327 | 1.60 |
| (8) | 360 | 5 min. | 2.15 | 26 | 8 | Transparent | 326 | 1.61 |

Note
¹Direction along the calendering direction
²Direction across the calendering direction

TABLE 2(2)

| Film No. | Crystalline conversion | Permeability of marker ink | Tensile strength (MPa) Along*¹ | Tensile strength (MPa) Across*² | Elongation (%) Along*¹ | Elongation (%) Across*² |
|---|---|---|---|---|---|---|
| (1) | 0 | Yes | 15.0 | 1.6 | 350 | 1600 |
| (2) | 0 | Yes | 15.5 | 1.6 | 340 | 1500 |
| (3) | 0.02 | Yes | 16.0 | 1.7 | 340 | 1500 |
| (4) | 0.25 | No | 29.4 | 20.6 | 480 | 1100 |
| (5) | 1.01 | No | 60.7 | 51.9 | 240 | 500 |
| (6) | 0.84 | No | 31.3 | 21.6 | 480 | 1000 |
| (7) | 1.01 | No | 57.8 | 50.5 | 250 | 600 |
| (8) | 1.01 | No | 59.8 | 51.0 | 230 | 550 |

Notes
¹ and ²See Notes of Table 2(1).

As understood from the results shown in Table 3, the porous PTFE films formed from the film Nos. (4) and (6) are stretchable in the direction across the calendering direction and have excellent tensile strength in this direction.

II. Expansion of uncut film

The heated film No. (4) of 100 mm long was stretched in a direction along the calendering direction at a pulling rate of 250%/sec. in a furnace kept at 300° C. to a predetermined expansion ratio.

Reduction rates of thickness and width, density, tensile strength and matrix strength are shown in Table 4.

In the same manner as described above, the heated film Nos. (2) and (4) were stretched to 600%. Then, the temperature in the furnace was raised to 350° C. and kept at the same temperature for 10 minutes (heat setting). When the film was removed from the furnace, it shrank further.

Reduction rates of thickness and width, density tensile strength and matrix strength of the thus formed porous PTFE film are shown in Table 5.

The reduction rates of the thickness and width of the film were calculated from the thickness and width of the central portion of the film before and after stretching respectively. The density of the film was calculated from the weight and thickness of the 5 cm × 5 cm piece cut from the central portion of the film.

The tensile strength of the film was an average value obtained by cutting out 5 strips of each 10 mm wide and 100 mm long from the film and measuring the tensile strength of each strip at a pulling rate of 200 mm/min.

The matrix strength shown in Tables 4 and 5 was calculated according to the following equation:

$$\text{Matrix strength} = \frac{\text{Tensile strength} \times 2.2}{\text{Density of stretched film}}$$

TABLE 4

| Stretching ratio | Reduction rate (%) Width | Reduction rate (%) Thickness | Density (g/cm$^3$) | Tensile strength (MPa) | Matrix strength (MPa) |
|---|---|---|---|---|---|
| 2.5 | 14 | 25 | 1.38 | 58.3 | 91.3 |
| 4.5 | 17 | 37 | 0.92 | 57.8 | 137 |
| 6 | 23 | 45 | 0.80 | 61.8 | 167 |
| 8 | 29 | 56 | 0.76 | 101 | 294 |
| 10 | 34 | 66 | 0.72 | 137 | 421 |
| 12.5 | 38 | 72 | 0.68 | 165 | 539 |

TABLE 5

| Film No. | Heat setting | Reduction rate (%) Width | Reduction rate (%) Thickness | Density (g/cm$^3$) | Tensile strength (MPa) | Matrix strength (MPa) |
|---|---|---|---|---|---|---|
| (4) | No*[1] | 23 | 45 | 0.80 | 61.7 | 167 |
|  | Yes | 45 | 55 | 1.40 | 108 | 167 |
| (2) | No | 10 | 25 | 0.32 | 21.6 | 147 |
|  | Yes*[2] | 25 | 30 | 0.40 | 29.4 | 167 |

Note
[1] The surface of this film is shown in FIG. 8.
[2] The cross section of this film is shown in FIG. 9.

III. Expansion at a rate not larger than 5%/sec.

The heated film (4) 20 mm wide and 50 mm long was stretched with the side ends free at a predetermined pulling rate to 500% in a direction along the calendering direction or to 800% in a direction across the calendering direction at 50° C.

The tensile strength was measured with a strip of 10 mm wide when the width was not less than 10 mm or with the film as such when the width is less than 10 mm at a pulling rate of 200 mm/min. in a direction along the calendering direction.

The density of the stretched film was determined as a ratio of the weight of a piece of the film (g) to the volume of the piece (width (cm) × length (cm) × thickness (cm)).

The results are shown in Table 6.

TABLE 6

| Stretching rate (%/sec.) Along | Stretching rate (%/sec.) Across | Breaking of film | Tensile strength (MPa) | Density (g/cm$^3$) |
|---|---|---|---|---|
| 1.5 | — | No | 57.8 | 1.1 |
| 0.5 | — | No | 57.3 | 1.1 |
| — | 5.0 | No | 62.9 | 1.0 |
| — | 1.5 | No | 64.0 | 1.1 |
| — | 0.5 | No | 62.1 | 1.1 |

The same film was easily stretched with fingers in both directions along and across the calendering direction to afford a porous PTFE film having a density of 1.1 g/cm$^3$.

IV. Expansion of compression molded article

A PTFE sheet of 100 mm wide and 1 mm thick was made from the same PTFE fine powder as used in Example 1 by compression molding under 200 Kg/cm$^2$ and heated in a salt bath kept at a predetermined temperature for a predetermined period of time.

The thus heated sheet was cut into a strip of 5 mm wide and 25 mm long. The strip was stretched in a direction along the calendering direction at a pulling rate of 1,000%/sec. to 1,000% in a furance kept at 300° C.

The specific gravity of the unstretched sheet, stretchability of the sheet and density of the stretched sheet are shown in Table 7.

TABLE 7

| Heating conditions (Temp. × Time) | 300° C. × 5 min. (Comparative) | 340° C. × 5 min. | 360° C. × 5 min. (Comparative) |
|---|---|---|---|
| Specific gravity of unstretched sheet | 1.65 | 2.22 | 2.17 |
| Stretchability | Broken at 10% | Yes | Broken at 300% |
| Density of stretched sheet (g/cm$^3$) | — | 1.1 | — |

EXAMPLE 2

In the same manner as in Example 1 but stretching the film at 25° ±2° C., a stretched PTFE film was prepared.

The properties of the thus obtained film are shown in Table 8, in which film Nos. (16) to (19) are comparative.

TABLE 8

| Film No. | Heating Temp. (°C.) | Heating Time (min.) | Existence of Endothermic peak at 345 ±5° C. | Crystalline conversion | Crystallinity (%) | Transparency | Specific gravity of Semisintered film (g/cm³) | Stretching direction | Stretchability |
| --- | --- | --- | --- | --- | --- | --- | --- | --- | --- |
| (9) | 328.6 | 30 | Yes | 0.16 | 93 | Opaque | 1.95 | Along*¹ | Yes |
|  |  |  |  |  |  |  |  | Across*² | Yes |
| (10) | 333.0 | 5 | Yes | 0.44 | 89 | Transparent | 2.23 | Along*¹ | Yes |
|  |  |  |  |  |  |  |  | Across*² | Yes |
| (11) | 333.0 | 30 | Yes | 0.48 | 92 | Transparent | 2.23 | Along*¹ | Yes |
|  |  |  |  |  |  |  |  | Across*² | Yes |
| (12)*⁴ | 335.0 | 6 | Yes | 0.57 | 86 | Transparent | 2.19 | Along*¹ | Yes |
|  |  |  |  |  |  |  |  | Across*² | Yes |
| (13) | 335.0 | 30 | Yes | 0.82 | 84 | Transparent | 2.32 | Along*¹ | Yes |
|  |  |  |  |  |  |  |  | Across*² | Yes |
| (14) | 347.5 | 0.1 | Yes | 0.47 | 85 | Transparent | 2.22 | Along*¹ | Yes |
|  |  |  |  |  |  |  |  | Across*² | Yes |
| (15) | 347.5 | 0.2 | Yes | 0.85 | 81 | Transparent | 2.18 | Along*¹ | Yes |
|  |  |  |  |  |  |  |  | Across*² | Yes |
| (16) | 324.8 | 60 | Yes | 0.05 | 95 | Opaque | 1.81 | Along*¹ | Yes |
|  |  |  |  |  |  |  |  | Across*² | (Uneven) |
| (17) | 347.5 | 0.4 | Yes*³ | 0.98 | 81 | Transparent | 2.16 | Along*¹ | (Broken) |
|  |  |  |  |  |  |  |  | Across*² | (Broken) |
| (18)*⁵ | 347.5 | 1 | No | 1.01 | 79 | Transparent | 2.14 | Along*¹ | (Broken) |
|  |  |  |  |  |  |  |  | Across*² | (Broken) |
| (19)*⁶ | (Not heated) |  | Yes | 0 | 97 | Opaque | 1.55 | Along*¹ | Yes |
|  |  |  |  |  |  |  |  | Across*² | (Uneven) |

Figure 7:
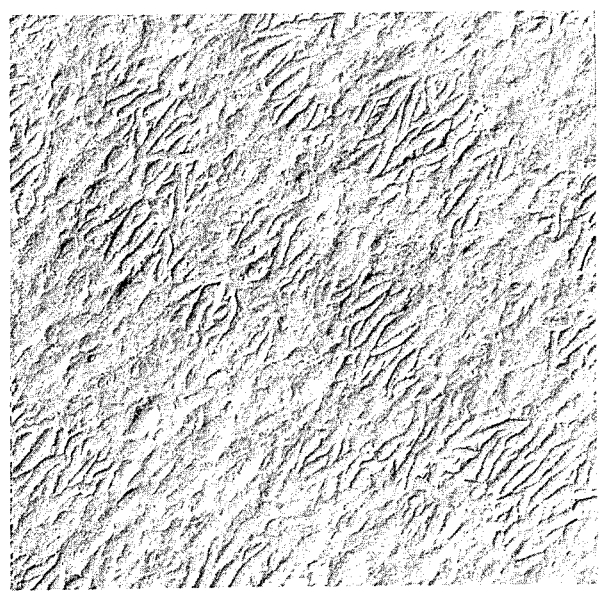

Note
¹ and ²See Notes of Table 2(1).
³small and broad
⁴The surface of this film is shown in FIG. 6.
⁵The surface of this film is shown in FIG. 7.
⁶The surface of this film is shown in FIG. 5.

EXAMPLE 3

The films obtained in Example 1 (1) and the heated cut films Nos. (4) and (5) were cut into a strip 50 mm long and 10 mm wide. Two strips cut out from the same film were superimposed on each other, and at one of the shorter ends of the superimposed films an area of 10 mm×5 mm was interposed in a hot press and kept under 1 MPa at 370° C. for 2 minutes to bond the end portions.

The adhesive strength of the bonded films was measured by pulling apart the non-bonded shorter end with a tensile machine.

The same test was repeated but using "Teflon 6J" (Trade name) in place of "Polyflon fine powder F-104".

The results are shown in Table 9, column A.

The bonded films were further heated at 370° C. for 30 minutes and the adhesion strength was measured.

The results are shown in Table 9, column B.

TABLE 9

| PTFE fine powder | Film | Adhesion strength (N/cm) A | B |
| --- | --- | --- | --- |
| Polyflon F-104 | Unsintered film | 18 | 25 |
|  | Film No. (4) | 17 | 22 |
|  | Film No. (5) | 12 | 11 |
| Teflon 6J | Unsintered film | 18 | 25 |
|  | Semisintered film | 18 | 20 |
|  | Sintered film | 11 | 12 |

As understood from the results shown in Table 9, the semisintered PTFE film as well as the unsintered PTFE film has a strong adhesive property when the films are heat pressed. On the contrary, the sintered PTFE film has a poor adhesivity. Further, it is also understood from the results that the object of the invention is achieved regardless of the kinds of the PTFE fine powders.

What is claimed is:

1. A biaxially stretchable semisintered polytetrafluoroethylene article having good tensile strength and smooth surface proportions which is prepared by heating an unsintered polytetrafluoroethylene article which has been obtained by paste-extrusion of polytetrafluoroethylene fine powder at a temperature of at least the melting point of a sintered polymer, the article having an endothermic curve at a temperature of 345°±5° C. on a crystalline melting chart measured with a differential scanning carolimeter and the crystalline conversion of from 0.10 to 0.85 defined by heat of fusion of the unsintered, semisintered and sintered polymers, and the crystallinity of the semisintered article measured by X-ray diffraction being from 80 to 93%.

2. The semisintered article according to claim 1, wherein the crystalline conversion is from 0.15 to 0.70.

3. The semisintered article according to claim 1, wherein the crystallinity is from 85 to 92%.

4. The semisintered article according to claim 1, wherein the specific gravity of the heated surface of the semisintered article is at least 1.80.

5. The semisintered article according to claim 1, wherein the unsintered article has a specific gravity of at least 1.4.

6. The semisintered article according to claim 1, wherein the unsintered article is a sheet or a film having a thickness less than 0.2 mm.

7. The semisintered article according to claim 1, wherein the unsintered article is a sheet or a film having a thickness of at least 0.2 mm, a tube having a wall thickness of at least 0.2 mm or a rod having a diameter of at least 0.2 mm.

8. A process for producing a biaxially stretchable semisintered polytetrafluoroethylene article having good tensile strength and smooth surface properties which comprises heating an unsintered polytetrafluoroethylene article which has been obtained by paste-extrusion of polytetrafluoroethylene fine powder at a temperature of at least the melting point of a sintered polymer, the article having an endothermic curve at a temperature of 345°±5° C. on a crystalline melting chart measured with a differential scanning carolimeter and the crystalline conversion of from 0.10 to 0.85 defined by heat of fusion of the unsintered, semisintered and sintered polymers, and the crystallinity of the semisintered article measured by X-ray diffraction being from 80 to 93%.

9. The process according to claim 8, wherein the heating is carried out at a temperature of from the melting point of the sintered polymer to the melting point of the unsintered polymer.

10. A process for producing a porous polytetrafluoroethylene material, which comprises expanding a semisintered article according claim 1 at a temperature lower than the melting point of the unsintered polymer.

11. A porous polytetrafluoroethylene material prepared by the process according to claim 10.

12. A biaxially stretchable and expandable semisintered polytetrafluoroethylene article having a specific gravity of at least 1.8, good tensile strength and a nonporous surface substantially free of particles and band structure which is prepared by heating an unsintered polytetrafluoroethylene article having a specific gravity of from 1.2 to 1.7 which has been obtained by paste-extrusion of polytetrafluoroethylene fine powder at a temperature of at least the melting point of a sintered polymer, the article having an endothermic curve at a temperature of 345°±5° C. on a crystalline melting chart measured with a differential scanning carolimeter and the crystalline conversion of from 0.15 to 0.70 defined by heat of fusion of the unsintered, semisintered and sintered polymers, and the crystallinity of the semisintered article measured by X-ray diffraction being from 85 to 92%.

13. The semisintered article according to claim 12, wherein the specific gravity of the semisintered article is from 2.20 to 2.25.

* * * * *